US010379828B2

United States Patent
Mineda et al.

(10) Patent No.: US 10,379,828 B2
(45) Date of Patent: Aug. 13, 2019

(54) PARALLELIZATION METHOD, PARALLELIZATION TOOL, AND IN-VEHICLE DEVICE

(71) Applicant: DENSO CORPORATION, Kariya, Aichi-pref. (JP)

(72) Inventors: Kenichi Mineda, Kariya (JP); Takayuki Nagai, Kariya (JP); Yu Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 3 days.

(21) Appl. No.: 15/618,320

(22) Filed: Jun. 9, 2017

(65) Prior Publication Data

US 2017/0357491 A1 Dec. 14, 2017

(30) Foreign Application Priority Data

Jun. 13, 2016 (JP) .................................. 2016-117247
Jun. 1, 2017 (JP) .................................. 2017-109497

(51) Int. Cl.
*G06F 8/41* (2018.01)
*G06F 9/48* (2006.01)

(52) U.S. Cl.
CPC .............. *G06F 8/45* (2013.01); *G06F 9/4881* (2013.01)

(58) Field of Classification Search
None
See application file for complete search history.

(56) References Cited

U.S. PATENT DOCUMENTS

| 5,347,639 A * | 9/1994 | Rechtschaffen | G06F 8/45 712/13 |
| 5,481,723 A * | 1/1996 | Harris | G06F 8/452 717/150 |
| 5,535,393 A * | 7/1996 | Reeve | G06F 8/45 712/10 |
| 5,781,775 A * | 7/1998 | Ueno | G06F 8/451 712/21 |

(Continued)

OTHER PUBLICATIONS

Patel, Devang, and Lawrence Rauchwerger. "Principles of Speculative Run—Time Parallelization." International Workshop on Languages and Compilers for Parallel Computing. Springer, Berlin, Heidelberg, 1998. (Year: 1998).*

(Continued)

*Primary Examiner* — Matthew J Brophy
(74) *Attorney, Agent, or Firm* — Posz Law Group, PLC

(57) ABSTRACT

A computer is configured to generate a parallel program for a multi-core microcomputer from a single program for a single-core microcomputer, based on a dependency analysis of a bundle of unit processes in the single program. The computer obtains dependency information that enables dependency determination of dependency un-analyzable unit processes. Further, the computer performs a dependency analysis of dependency analyzable unit processes. Then, the computer assigns the dependency un-analyzable unit processes and the dependency analyzable unit processes respectively to multiple cores of the multi-core microcomputer, while fulfilling dependency among those processes, based on the obtained dependency information of the dependency un-analyzable unit processes and an analysis result of the dependency analyzable unit processes.

11 Claims, 11 Drawing Sheets

(56) References Cited

U.S. PATENT DOCUMENTS

| | | | | |
|---|---|---|---|---|
| 5,802,338 A * | 9/1998 | Rechtschaffen | G06F 8/456 | 712/216 |
| 5,802,374 A * | 9/1998 | Gupta | G06F 8/458 | 712/216 |
| 6,292,939 B1 * | 9/2001 | Itou | G06F 8/458 | 712/E9.032 |
| 8,010,550 B2 * | 8/2011 | Duffy | G06F 9/467 | 707/713 |
| 8,392,900 B1 * | 3/2013 | Collard | G06F 8/458 | 717/159 |
| 8,417,919 B2 * | 4/2013 | Allen | G06F 9/5038 | 712/216 |
| 8,438,359 B2 * | 5/2013 | Kasahara | G06F 8/453 | 711/129 |
| 8,527,971 B2 * | 9/2013 | Helovuo | G06F 8/456 | 717/144 |
| 8,584,106 B2 * | 11/2013 | Papakipos | G06F 8/456 | 717/136 |
| 8,745,603 B2 * | 6/2014 | McGuire | G06F 8/45 | 717/140 |
| 8,799,881 B2 * | 8/2014 | Tojo | G06F 8/452 | 717/136 |
| 8,839,212 B2 * | 9/2014 | Cooke | G06F 8/456 | 717/140 |
| 8,863,105 B2 * | 10/2014 | Jie | G06F 8/45 | 717/144 |
| 9,110,692 B2 * | 8/2015 | Master | G06F 8/45 | |
| 9,122,523 B2 * | 9/2015 | Pienaar | G06F 8/451 | |
| 9,208,066 B1 * | 12/2015 | Mizrahi | G06F 8/452 | |
| 9,262,139 B2 * | 2/2016 | Howes | G06F 8/443 | |
| 9,395,957 B2 * | 7/2016 | Ringseth | G06F 8/31 | |
| 9,400,685 B1 * | 7/2016 | Ge | G06F 9/4881 | |
| 9,489,183 B2 * | 11/2016 | Ringseth | G06F 8/314 | |
| 9,507,568 B2 * | 11/2016 | Ringseth | G06F 8/45 | |
| 9,684,494 B2 * | 6/2017 | Mizrachi | G06F 8/41 | |
| 9,727,377 B2 * | 8/2017 | Martinez Canedo | G06F 8/451 | |
| 9,760,355 B2 * | 9/2017 | Mori | G06F 8/452 | |
| 9,830,157 B2 * | 11/2017 | Gupta | G06F 8/314 | |
| 9,971,570 B2 * | 5/2018 | Sevenich | G06F 8/456 | |
| 2004/0194074 A1 * | 9/2004 | Shibayama | G06F 8/456 | 717/151 |
| 2007/0169059 A1 * | 7/2007 | Halambi | G06F 8/4452 | 717/160 |
| 2007/0283358 A1 * | 12/2007 | Kasahara | G06F 9/5044 | 718/104 |
| 2010/0070740 A1 * | 3/2010 | Allen | G06F 9/5038 | 712/30 |
| 2010/0174876 A1 * | 7/2010 | Kasahara | G06F 8/453 | 711/154 |
| 2011/0231605 A1 * | 9/2011 | Ogawa | G06F 3/061 | 711/114 |
| 2012/0047353 A1 * | 2/2012 | Gupta | G06F 8/314 | 712/220 |
| 2012/0159507 A1 * | 6/2012 | Kwon | G06F 9/5088 | 718/104 |
| 2012/0239910 A1 * | 9/2012 | Gonion | G06F 8/41 | 712/222 |
| 2013/0031560 A1 * | 1/2013 | Gargash | G06F 11/3013 | 718/104 |
| 2014/0026145 A1 * | 1/2014 | Canedo | G06F 8/433 | 718/105 |
| 2014/0165077 A1 * | 6/2014 | Martinez Canedo | G06F 8/451 | 718/105 |
| 2014/0281435 A1 * | 9/2014 | Perkins | G06F 9/30145 | 712/227 |
| 2014/0372995 A1 * | 12/2014 | Mori | G06F 8/452 | 717/146 |
| 2015/0363230 A1 * | 12/2015 | Kasahara | G06F 9/4881 | 718/106 |

OTHER PUBLICATIONS

Patel, Devang, and Lawrence Rauchwerger. "Implementation issues of loop-level speculative run-time parallelization." International Conference on Compiler Construction. Springer, Berlin, Heidelberg, 1999. (Year: 1999).*

Huang, Jialu, et al. "Automatically exploiting cross-invocation parallelism using runtime information." Code Generation and Optimization (CGO), 2013 IEEE/ACM International Symposium on. IEEE, 2013. (Year: 2013).*

* cited by examiner

| MT PROCESS NAME | MT PROCESS NAME IN DEPENDENCY | |
|---|---|---|
| 11TH MT PROCESS | 12TH MT PROCESS, 13TH MT PROCESS | ~33 |
| 12TH MT PROCESS | 11TH MT PROCESS | |
| 13TH MT PROCESS | 11TH MT PROCESS | |

| MT PROCESS NAME | ACCESSED RESOURCE NAME | Read/Write |
|---|---|---|
| 11TH MT PROCESS | V1 | Write |
| ↑ | V2 | Write |
| 12TH MT PROCESS | V1 | Read |
| 13TH MT PROCESS | V2 | Read |

| DEP. INFO. | | |
|---|---|---|
| FUNCTION NAME | ACCESSED RESOURCE NAME | Read/Write |
| func1a | Unknown2 (0xFFFF0000) | Write |
| func1a | Unknown3 (*p) | Write |

| FUNCTION NAME | ACCESSED RESOURCE NAME | Read/Write |
|---|---|---|
| func2a | V1 | Read |

| FUNCTION NAME | ACCESSED RESOURCE NAME | Read/Write |
|---|---|---|
| func3a | Unknown4 (0xFFFF0004) | Read |

| UNKNOWN RESOURCE NAME | SAME RESOURCE INFO. |
|---|---|
| Unknown2 | V1 |
| Unknown3 | Unknown4 |

FIG. 16

DEP. INFO.

Module3 LIST

| FUNCTION NAME | ACCESSED RESOURCE NAME | Read/Write | DETAILS OF UNKNOWN RESOURCE | |
|---|---|---|---|---|
| | | | DEFINED MODULE NAME | RESOURCE NAME |
| func1a | Unknown2 (0xFFFF0000) | Write | Module1 | V1 |
| func1a | Unknown3 (*P) | Write | Module2 | Unknown2 (Module2) |

Module1 LIST

| FUNCTION NAME | ACCESSED RESOURCE NAME | Read/Write | DETAILS OF UNKNOWN RESOURCE | |
|---|---|---|---|---|
| | | | DEFINED MODULE NAME | RESOURCE NAME |
| func2a | V1 | Read | – | – |

Module2 LIST

| FUNCTION NAME | ACCESSED RESOURCE NAME | Read/Write | DETAILS OF UNKNOWN RESOURCE | |
|---|---|---|---|---|
| | | | DEFINED MODULE NAME | RESOURCE NAME |
| func3a | Unknown2 (0xFFFF0004) | Read | – | – |

PARALLELIZATION METHOD, PARALLELIZATION TOOL, AND IN-VEHICLE DEVICE

CROSS REFERENCE TO RELATED APPLICATION

The present application is based on and claims the benefit of priority of Japanese Patent Applications No. 2016-117247, filed on Jun. 13, 2016, and No. 2017-109497, filed on Jun. 1, 2017, the disclosure of which are incorporated herein by reference.

TECHNICAL FIELD

The present disclosure generally relates to a parallelization method for generating a parallel program for a multi-core microcomputer from a single program for a single-core microcomputer, based on a dependency analysis of a bundle of unit processes, i.e., a plurality of units of processing, in the single program, and a parallelization tool, and an in-vehicle device that implements a parallel program generated by the parallelization method.

BACKGROUND INFORMATION

A parallelization compile method is disclosed as an example of a parallelization method that generates a parallel program for a multi-core microcomputer from a single program for a single-core microcomputer in a patent document, Japanese Patent Laid-Open No. 2015-1807 (patent document 1).

The parallelization compile method generates an intermediate language from a source code of the single program by performing a lexical analysis and a syntax analysis, and, by using such an intermediate language, performs a dependency analysis of/among a plurality of Macro Tasks (MT processes) and optimization of the macro tasks and the like. Further, the parallelization compile method generates a parallel program based on a scheduling of the plurality of macro tasks which takes into account the dependency of each of the MT processes as well as an execution time of each of the MT processes.

However, some of unit processes, i.e., the MT processes and functions of the single program, may be dependency un-analyzable processes. When some of the unit processes are the dependency un-analyzable processes, the multi-core microcomputer may not be able to appropriately perform a parallel execution of the dependency un-analyzable processes. Thus, the parallelization compile method cannot parallelize the dependency un-analyzable processes.

SUMMARY

It is an object of the present disclosure to provide a parallelization method and a parallelization tool for generating a parallel program that enables parallelization of a greater number of unit processes, and an in-vehicle device that is capable of executing the parallel program having a greater number of unit processes.

In one aspect of the present disclosure, a parallelization method that generates a parallel program is executable by a multi-core microcomputer that has a plurality of cores based on a dependency analysis of a bundle of unit processes in a single program that is executed by a single-core microcomputer having one core.

The parallelization method includes an obtaining procedure for obtaining dependency information that enables a dependency determination of a dependency un-analyzable process, the dependency un-analyzable process including a bundle of unit processes for which the dependency analysis is unperformable.

The parallelization method also includes an analysis procedure for performing the dependency analysis of a dependency analyzable process, the dependency analyzable process including a bundle of unit processes for which the dependency analysis is performable.

The parallelization further includes an assigning procedure for assigning each of the dependency un-analyzable process and the dependency analyzable process to each of the plurality of cores while fulfilling dependency among the dependency un-analyzable process and the dependency analyzable process, based on (i) the dependency information obtained by the obtaining procedure and (ii) an analysis result of the dependency analysis by the analysis procedure.

The dependency fulfillment described in the above may be more specifically described as fulfilling required dependency among the unit processes, or dependency requirement for an appropriate operation of the bundle/plurality of the unit processes.

According to another aspect of the present disclosure described above, the parallelization method is enabled to obtain the dependency information that enables, or is usable for, a determination of the dependency relationship of the dependency un-analyzable process. Then, the parallelization method assigns the dependency un-analyzable process or the dependency analyzable process to the multiple cores of the microcomputer. Therefore, the parallelization method is enabled to parallelize not only the dependency analyzable process, but also the dependency un-analyzable process. Thus, the parallelization method of the present disclosure is capable of generating a parallel program that has a greater number of unit processes parallelized than the conventional parallel program, i.e., the parallel program generated in the conventional manner.

In another aspect of the present disclosure, a parallelization tool that generates a parallel program is executed by a multi-core microcomputer having a plurality of cores based on a dependency analysis of a bundle of unit that processes in a single program that is executed by a single-core microcomputer having one core.

The parallelization tool includes an obtainer that obtains dependency information that enables a dependency determination of a dependency un-analyzable process. The dependency un-analyzable process is included the bundle of unit processes for which the dependency analysis is unperformable.

The parallelization tool also includes an analyzer that performs the dependency analysis of a dependency analyzable process. The dependency analyzable process is included in the bundle of unit processes for which the dependency analysis is performable.

The parallelization tool further includes an assigner that assigns each of the dependency un-analyzable process and the dependency analyzable process to each of the plurality of cores while fulfilling dependency among the dependency un-analyzable process and the dependency analyzable process, based on (i) the dependency information obtained by the obtainer and (ii) an analysis result of the dependency analysis by the analyzer.

Thus, the parallelization tool is capable of generating a parallel program that has a greater number of unit processes parallelized than the conventional parallel program, just like the parallelization method described above.

In yet another aspect of the present disclosure, an in-vehicle device includes a multi-core microcomputer having a plurality of cores, and a parallel program for the multi-core microcomputer, the parallel program being a parallelization of a bundle of unit processes included in a single program for a single-core microcomputer having a single core. The parallel program is assigned to the plurality of cores of the multi-core microcomputer, the assignment of the parallel program including assignment of (i) a dependency un-analyzable process and (ii) a dependency analyzable process among the bundle of unit processes, which is performed based on (a) dependency information that enables a dependency determination regarding dependency of the dependency un-analyzable process for which the dependency analysis is unperformable, and (b) an analysis result of dependency of the dependency analyzable process while fulfilling the dependency among the dependency un-analyzable process and dependency analyzable process, and each of the plurality of cores of the multi-core microcomputer executes each of the assigned unit processes.

Therefore, the in-vehicle device, as described above, includes the parallel program that includes a greater number of unit processes. Thus, the present disclosure is capable of appropriately and optimally executing each of the unit processes.

The numerals in parentheses in the claims and in the Summary section in the above exemplarily show a relationship between (i) concrete components and operations in the embodiment and (ii) claim elements, thereby not binding any of such relationship in any manner.

BRIEF DESCRIPTION OF THE DRAWINGS

Objects, features, and advantages of the present disclosure will become more apparent from the following detailed description made with reference to the accompanying drawings, in which:

FIG. 15 is an illustration of the dependency information that defines/specifies the dependency relationship by using the resources in the modification 4 of the present disclosure;

FIG. 16 is an illustration of the dependency information that associates the resources with modules in the modification 4 of the present disclosure.

DETAILED DESCRIPTION

Embodiments for implementing the present disclosure are described with reference to the drawings in the following. In each of those embodiments, the same numerals are assigned to the same components, for not repeating the description of the same components in many embodiments. When a part of the configuration is described, the rest of the configuration is borrowed from the other previous embodiment(s).

In the present embodiment, based on plural unit processes in a single program for a single-core microcomputer which has one core, a parallel program $21a1$ parallelized for a multi-core processor 21 that has a first core $21c$ and a second core $21d$ is generated. In the following, a processor can be designated as a microcomputer. Therefore, a multi-core processor can be designated as a multi-core microcomputer.

The above-mentioned unit processes are, respectively, a unit core allocation or a function assigned to the multiple cores as a minimum unit of processing. The unit core allocation may also be designated in another way as a processing block, a Macro Task, (MT) process, or the like.

The relationship of these unit processes may be, for example, a unit core allocation that is larger than or equal to a function. That is, a function may be a unit core allocation itself, or may be a parent function or a sub function included in a unit core allocation. In the present embodiment, the MT process is adopted as a unit process.

A background of generating and using the parallel program $21a1$ may be understood as an increase of heat generation from a processor, an increase of power consumption of a processor as well as an upper limit clock frequency of a processor, which lead a trend that a multi-core processor 21 becomes dominant in the market. Also, in the field of the in-vehicle device, application of the multi-core processor 21 is required.

Further, as the parallel program $21a1$, it has to be reliable and capable of performing a high-speed processing, while accommodating a demand for a short-term software development and a low-cost software development.

Figure 1:
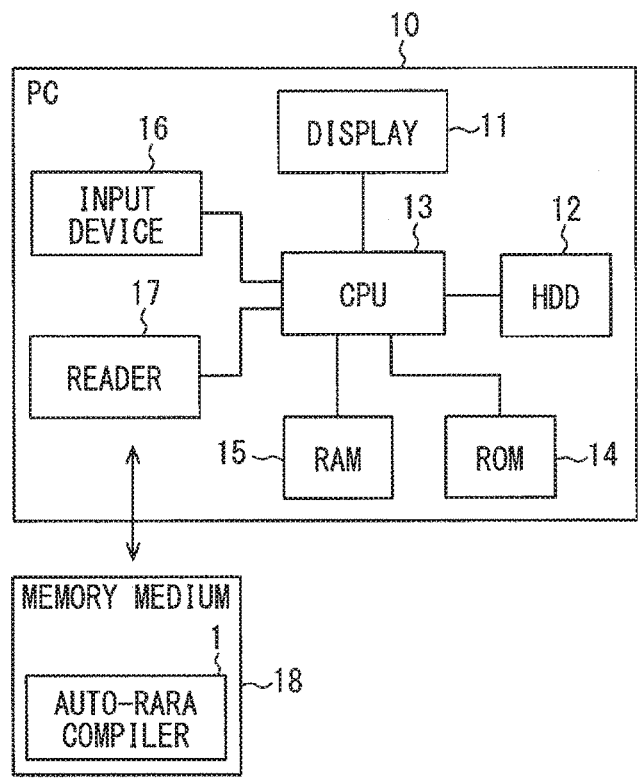
FIG. 1 is a block diagram of a computer in one embodiment of the present disclosure.

Here, the configuration of a computer 10 is described with reference to FIG. 1

The computer 10 is equivalent to a parallelization tool in the claims, which performs a parallelization method and generates the parallel program $21a1$.

The computer 10 is provided with a display 11, a hard disk drive (HDD) 12, a Central Processing Unit (CPU) 13, a Read-Only Memory (ROM) 14, a Random-Access Memory (RAM) 15, an input device 16, a reader 17, and the like.

Further, the computer 10 is capable of reading memory contents memorized by a memory medium 18. In the memory medium 18, an automatic parallelization compiler 1 is memorized.

Regarding a configuration of the computer 10 and the memory medium 18, please refer to a personal computer 100 and a memory medium 180 disclosed in a patent document, JP 2015-1807 A, for the details.

Figure 3:
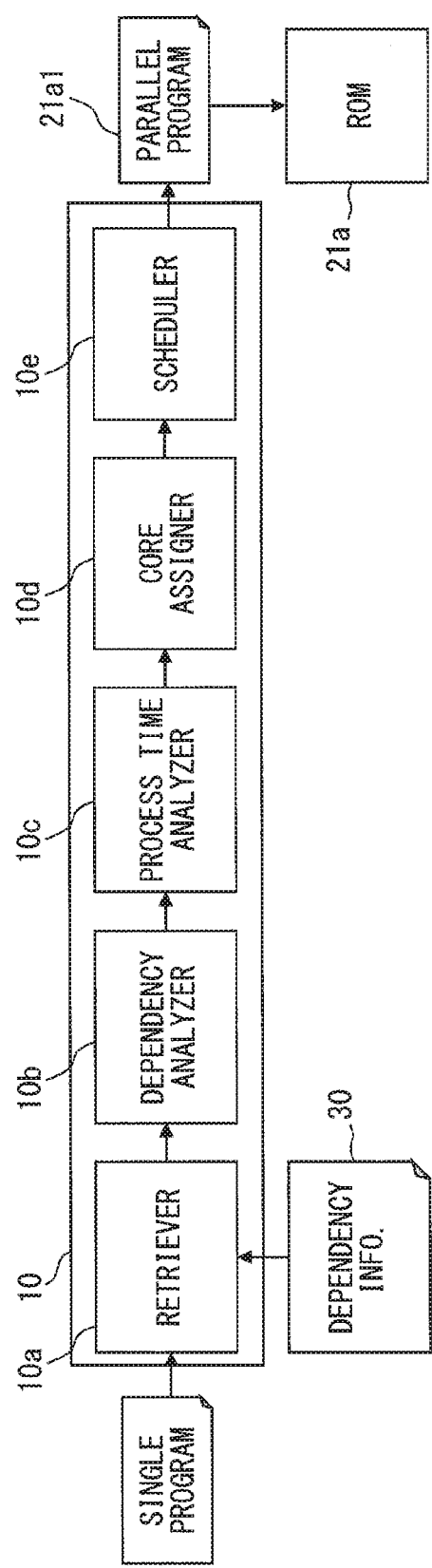
FIG. 3 is a block diagram of functions of the computer in the one embodiment of the present disclosure.

In addition to what is disclosed in JP 2015-1807 A, the automatic parallelization compiler 1 includes a retriever 10a and the like, as shown in FIG. 3. The retriever 10a is described later in detail.

The automatic parallelization compiler 1 includes a procedure for generating the parallel program 21a1. Therefore, the automatic parallelization compiler 1 is equivalent to a parallelization method in the claims. That is, the automatic parallelization compiler 1 is a program including the parallelization method.

The computer 10 generates the parallel program 21a1 by executing the automatic parallelization compiler 1.

For example, the computer 10 generates the parallel program 21a1, which is a source code written in C language, from a single program that is also a source code written in C language.

However, the present disclosure is not limited to such form.

The single program may be written in a different programming language other than C language.

Similarly, the parallel program 21a1 may also be written in a different programming language other than C language.

When generating the parallel program 21a1, a dependency relationship (i.e., may simply be described as "dependency" hereafter in the embodiments and in the claims) of a plurality of the MT processes in the single program is analyzed, and a plurality of the MT processes are respectively assigned to either one of the two cores 21c and 21d of the multi-core processor 21.

In other words, a program for the single-core microcomputer is analyzed, and software including parallelized MT processes that are parallelized for the multi-core microcomputer is generated.

"Assigning" the MT processes to multiple cores in a microcomputer may also be designated as "allocating", "allotting", "laying out " or the like.

Each of a plurality of the MT processes is assigned to the first core 21c or to the second core 21d, while maintaining the dependency relationship of a plurality of the MT processes in such an assigning operation.

Please refer to JP 2015-1807 A about this point,

The dependency relationship, i.e., dependency in the claims, for example, a relationship in which a certain MT process refers to data that is updated by other MT process executed in advance.

That is, a plurality of the MT processes includes a precedent process and a subsequent process, among which the execution of the precedent process precedes the execution of the subsequent process in the single program.

Further, the subsequent process is an MT process affected/influenced by the precedent process, and is an MT process using the updated data, i.e., updated contents updated by the precedent process, for example.

A dependency relationship may also be described as follows. That is, when both of the precedent process and the subsequent process simply refer to the same data, there is no dependency relationship between the two processes, because replacing (i.e., switching) the processing order of the two processes does not yield a different result.

However, in the single program, a dependency un-analyzable process is also included, which is an MT process whose dependency relationship is un-analyzable, or is difficult to analyze. What is meant by "dependency un-analyzable" and "dependency analysis is difficult" is that a dependency analyzer 10b in the computer 10 for analyzing the dependency relationship cannot analyze, or has difficulty in analyzing, the dependency relationship of a subject process.

The dependency un-analyzable process may be, for example, a pointer-related MT process, which is because a complete analysis of dependency of such process cannot be performable unless a value estimation of variables (i.e., an operation estimation of variables) is performable.

However, the dependency un-analyzable process is not limited to a pointer-related MT process.

Among the MT processes of the single program, processes whose dependency relationship is analyzable by the dependency analyzer 10b are designated as dependency analyzable processes.

Thus, since analysis of the dependency relationship by the dependency analyzer 10b cannot be performed, the dependency un-analyzable process cannot be parallelized.

When the dependency un-analyzable processes are not parallelized, only the dependency analyzable processes in the single program are parallelized in the parallel program 21a1.

The parallel program 21a1 having the parallelization of the dependency analyzable processes only has fewer parallelized MT processes to be executed in parallel by the first core 21c and the second core 21d, in comparison to a parallel program having the parallelization of both of the dependency analyzable processes and the dependency un-analyzable processes.

Therefore, the parallel program 21a1 parallelizing the dependency analyzable processes only is less efficient in terms of processing operation by the first core 21c and the second core 21d, in comparison to a parallel program parallelizing both of the dependency analyzable processes and the dependency un-analyzable processes.

Thus, the computer 10 determines the dependency relationship about the dependency un-analyzable process by using dependency information 30 which shows the dependency relationship of the dependency un-analyzable process. The dependency information 30 is described later in detail.

In addition to the above-mentioned retriever 10a and the dependency analyzer 10b, the computer 10 is provided with a process time analyzer 10c, a core assigner 10d, and a scheduler 10e, respectively as a function block, as shown in FIG. 3.

Although not explicitly described, the computer 10 is also provided with the well-known lexical-analysis section and the like.

The retriever 10a reads, or retrieves, the dependency information 30, in order to determine the dependency relationship of the dependency un-analyzable process. That is, the dependency information 30 is inputted to the computer 10. The retriever 10a is equivalent to an obtainer in the claims.

The computer 10 reads the dependency information 30 by executing the automatic parallelization compiler 1. Therefore, the retriever 10a may also be equivalent to an obtaining procedure in the claims.

The dependency information 30 is information, as described above, for determining the dependency relationship of the dependency un-analyzable process, and is, for example, a part of information used when designing the single program.

Therefore, the dependency information 30 can also be designated as design information.

Especially, the dependency information 30 of the present embodiment is information that shows a MT process having a dependency relationship with the dependency un-analyzable process.

In other words, the dependency information 30 indicates that, even though the dependency of the dependency un-analyzable process is un-analyzable by the dependency analyzer 10b, the dependency un-analyzable process actually has dependency with/on plural MT processes.

That is, the dependency information 30 in the present embodiment shows a direct association between (i) the dependency un-analyzable process and (ii) the MT process(es) having the dependency relationship with the dependency un-analyzable process.

Therefore, the dependency information 30 can also be designated as direct-type information 30.

The direct-type information 30 may include, for example, a name of the MT process having the dependency relationship with the dependency un-analyzable process. That is, the direct-type information 30 includes both of (i) a name of the dependency un-analyzable process and (ii) a name of the MT process that has the dependency relationship with the dependency un-analyzable process, thereby establishing association of names of the MT processes having the dependency relationship with each other, both of which depend on the same dependency un-analyzable process.

Note that each piece of information associating (i) a name of the dependency un-analyzable process and (ii) a name of the MT process having the dependency relationship with the dependency un-analyzable process may be designated as a "list." Therefore, the dependency information 30 is considered as including a list of each of the dependency un-analyzable processes.

Further, when the dependency information 30 is read or is retrieved, the dependency information 30 reads a list that corresponds to a dependency un-analyzable process. That is, the dependency information 30 reads a list of a target dependency un-analyzable process from among a plurality of lists included in the dependency information 30.

Figure 5:
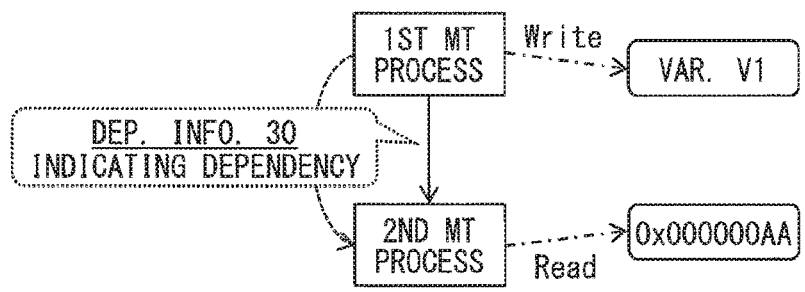
FIG. 5 is an illustration of dependency information that defines/specifies a dependency relationship by using unit processes in the one embodiment of the present disclosure.

Here, the above situation is described with reference to FIG. 5, in terms of how a dependency relationship among the MT processes is defined/specified.

A first MT process performs "Write" (i.e., issues a write commend) to a variable V1. A second MT process performs "Read" (i.e., issues a read command) to 0x000000AA. Further, the variable V1 and 0x000000AA are the same data. In such case, the first MT process and the second MT process have the dependency relationship.

However, the dependency analyzer 10b does not know, i.e., cannot determine, whether the variable V1 and 0x000000AA are the same data. However, in the direct-type information 30 in such case, the name of the first MT process and the name of the second MT process are associated with each other.

Therefore, by using the direct-type information 30, the computer 10 can determine the dependency relationship between the first MT process and the second MT process.

The dependency analyzer 10b analyzes the dependency relationship of the dependency analyzable process. In other words, the dependency analyzer 10b analyzes the dependency relationship of the dependency analyzable process, and extracts information that enables determination of the dependency relationship of the dependency analyzable process.

Detailed description of the dependency analyzer 10b is omitted.

The dependency analyzer 10b is equivalent to an analyzer in the claims.

Note that the computer 10 analyzes the dependency relationship by executing the automatic parallelization compiler 1. Therefore, the dependency analyzer 10b may also be equivalent to an analysis procedure in the claims.

The core assigner 10d assigns the dependency un-analyzable process and the dependency analyzable process to the cores 21c and 21d based on the dependency information 30 obtained by the retriever 10a, and an analysis result analyzed by the dependency analyzer 10b, while fulfilling the dependency relationship.

As mentioned above, since the computer 10 obtains the dependency information 30, the computer 10 can, i.e., is enabled to, determine the dependency relationship of the dependency un-analyzable process.

Therefore, the core assigner 10d can assign, to each of the cores 21c and 21d, not only the dependency analyzable process, but also the dependency un-analyzable process.

The core assigner 10d is equivalent to an assigner in the claims.

Note that the computer 10 assigns each of the MT processes to each of the cores by executing the automatic parallelization compiler 1. Therefore, the core assigner 10d may also be equivalent to an assigning procedure in the claims.

Further, the process time analyzer 10c and the scheduler 10e are both well-known in the art. Therefore, the detailed description of the process time analyzer 10c and the scheduler 10e is omitted.

Next, the processing operation at the time of executing the automatic parallelization compiler 1 by the computer 10 is described with reference to FIG. 4.

The computer 10 generates the parallel program 21a1 by executing the automatic parallelization compiler 1. Each of the steps of FIG. 4 may be equivalent to each of the procedures performed by the automatic parallelization compiler 1.

In Step S10, MT process that has not yet been analyzed is searched for. The computer 10 performs the process of FIG. 4 for each of a plurality of the MT processes in the single program.

That is, the computer 10 in Step S10 searches for an MT process that has not yet undergone the process after Step S12, among a plurality of the MT processes in the single program.

In other words, the computer 10 extracts, from among a plurality of the MT processes in the single program, an MT process that has not yet undergone the process after Step S12.

Note that a dependency un-analyzable process extracted in Step S10 may also be designated as a searched MT process.

For example, in the single program including the first MT process, the second MT process, and an n-th MT process, when the second MT process is extracted in Step S10, a searched MT process is the second MT process. A number 'n' used in the above is a natural number of three or greater.

In Step S12, it is determined whether the dependency information 30 i.e., the direct-type information 30) includes the searched MT process.

That is, the computer 10 determines whether an MT process that is associated with the searched MT process in Step S10 is included in the direct-type information 30.

The process in the computer 10 proceeds to Step S16, when it is determined that the searched MT process is included in the direct-type information 30, and when it is determined that the searched MT process is not included in the direct-type information 30, the process proceeds to Step S14, In Step S14, the code in the searched MT process is analyzed and the dependency relationship is extracted. That is, the dependency analyzer 10*b* of the computer 10 extracts the dependency relationship of each of the MT processes as described above.

In other words, the dependency analyzer 10*b* of the computer 10 extracts, in Step S14, the information for determining the dependency relationship of each of the MT processes, i.e., a resource accessed by the MT process and the contents of processing for the accessed resource.

Then, the dependency analyzer 10*b* of the computer 10 extracts the MT process having the dependency relationship with the searched MT process.

The accessed resource is a resource accessed by the core, when the MT process is performed. Further, the contents of processing for the accessed resource are writing to the resource or reading from the resource. Further, the resource may include data, a register, and an order constraint.

Further, information associating (i) the accessed resource accessed by a unit process and (ii) the contents of processing performed by the unit process may be designated as resource access information.

On the other hand, in Step S16, the direct-type information 30 is considered as the dependency relationship of the searched MT process. That is, the computer 10 determines an associated MT process that is associated with the searched MT process by the direct-type information 30 as the dependency of the searched MT process.

In other words, the computer 10 defines that an MT process that is associated with the searched MT process by the direct-type information 30 as a dependent MT process that is dependent on the searched MT process, or a dependent MT process having the dependent relationship with the searched MT process.

Figure 4:
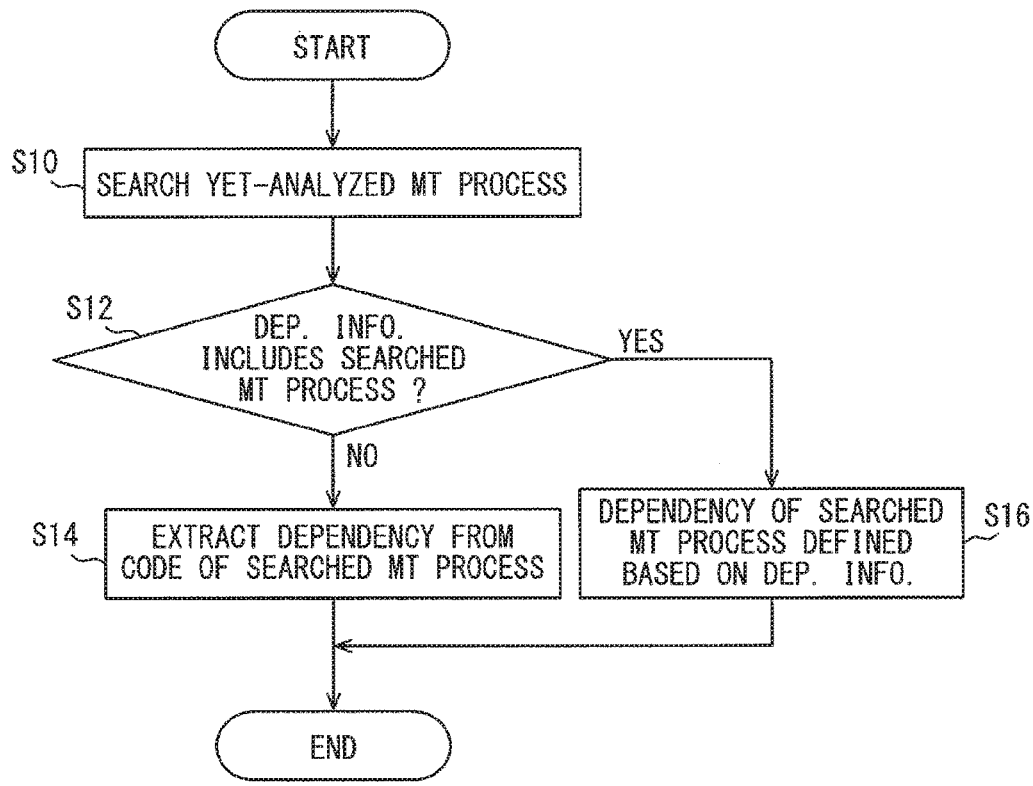
FIG. 4 is a flowchart of a process performed by the computer in the one embodiment of the present disclosure.

The computer 10 repeats Steps S10-S16, for performing a flowcharted process of FIG. 4 for all the MT processes in the single program.

Further, the computer 10 assigns the dependency un-analyzable process and the dependency analyzable process to the cores based on (i) the dependency information and (ii) the analysis result by the dependency analyzer 10*b*, while fulfilling the dependency relationship.

The parallel program 21*a*1 may include two MT processes having the dependency relationship, and one of which is assigned to the core 21*c* while the other is assigned to the core 21*d*.

Therefore, in such case, the parallel program 21*a*1 includes a synchronization process synchronizing the two, precedent and subsequent MT processes assigned to the respectively different cores, i.e., execution of a subsequent MT process synchronized to wait for a completion of execution of a precedent MT process for an appropriate processing order.

That is, the synchronization process of the parallel program 21*a*1 controls one core and the other core respectively having a first MT process assigned to the one core, and a second MT process assigned to the other core in the following manner. That is, while executing the second MT process assigned to the other core completes after completing the execution of the first MT process by the one core, the synchronization process controls the one core to execute the next MT process that is assigned to the one core. In such case, the second MT process assigned to the other core has the dependency relationship with the next MT process assigned to the one core, and the execution of the next MT process assigned to the one core should be performed after the execution of the second MT process assigned to the other core.

Therefore, in order to perform the synchronization process, when execution of the MT processes assigned to respective cores is complete, the first core 21*c* and the second core 21*d* respectively access a RAM 21*b*, for memorizing in the RAM 21*b* information that the respective cores are in waiting for synchronization (i.e., completion information).

Then, the one core waiting for a completion of execution of the MT process by the other core with which the MT process to be performed by one core has the dependency relationship that confirms whether the RAM 21*b* memorizes the completion information by intermittently accessing the RAM 21*b*, without performing the MT process.

That is, the one core waiting for a completion of execution of the MT process by the other core intermittently operates during a non-operation period, for accessing the RAM 21*b* and confirming whether the completion information is memorized.

In such manner, the first core 21*c* and the second core 21*d* wait for each other's execution completion, i.e., operate in synchronization, for performing the MT processes.

Therefore, the synchronization process can also be designated as a waiting process. Note that the parallel program 21*a*1 includes a program executed by the first core 21*c* and a program executed by the second core 21*d*.

Figure 2:
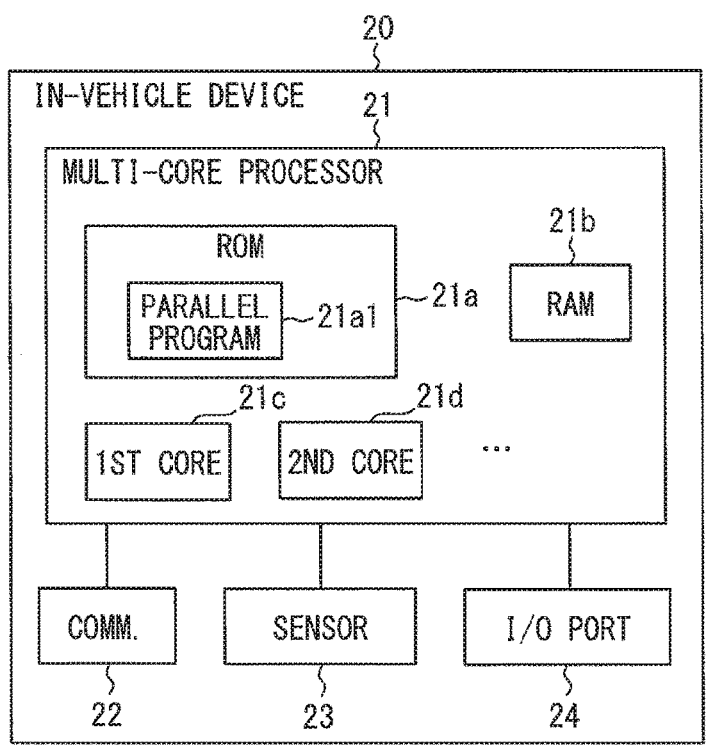
FIG. 2 is a block diagram of an in-vehicle device in the one embodiment of the present disclosure.

Next, the configuration of an in-vehicle device 20 is described. The in-vehicle device 20 includes, as shown in FIG. 2, a multi-core processor 21, a communicator 22, a sensor 23, and an input/output port 24.

The multi-core processor 21 is provided with a ROM 21*a*, the RAM 21*b*, the first core 21*c*, and the second core 21*d*.

The in-vehicle device 20 may be applicable to an engine control device, a hybrid control device, and the like, which are disposed in a vehicle, for example. In the present embodiment, an example of applying the in-vehicle device 20 to the engine control device is described. In the present embodiment, the parallel program 21*a*1 may be an automobile control program for performing an engine control. However, the parallel program 21*a*1 is not limited to such an example. Note that the core may also be designated as a processor element.

By executing the parallel program 21*a*1, the first core 21*c* and the second core 21*d* perform the engine control. More practically, the first core 21*c* and the second core 21*d* perform the engine control by performing the waiting process and the like while performing the MT processes of the parallel programs 21*a*1 assigned to the respective cores.

Regarding the RAM 21*b*, the communicator 22, the sensor 23, and the input/output port 24, please refer to a RAM 420, a communicator 430, a sensor 450, and an input/output port 460 disclosed in the above-mentioned patent document JP 2015-1807 A.

As mentioned above, in the computer 10, even when an analysis of the dependency relationship is impossible for the dependency un-analyzable process, the direct-type information 30 indicating the dependency relationship of the dependency un-analyzable process is obtainable.

Then, the computer 10 assigns, based on the direct type information 30 and the analysis result of the dependency analyzable process, the dependency un-analyzable process and the dependency analyzable process to the cores 21c and 21d.

Therefore, in addition to the dependency analyzable process, the dependency un-analyzable process can also be parallelized by the computer 10. Thus, the computer 10 is capable of generating the parallel program 21a1, which parallelizes a greater number of the MT processes. That is, the computer 10 can generate the parallel program 21a1 by which a greater number of the MT processes parallelized in comparison to a parallel program that parallelizes the dependency analyzable processes only.

Note that the computer 10 analyzes the dependency relationship by executing the automatic parallelization compiler 1. Therefore, the automatic parallelization compiler 1 achieves the same effects as the computer 10.

The in-vehicle device 20 includes the parallel program 21a1, which parallelizes a greater number of the MT processes. Therefore, the in-vehicle device 20 can perform each of the MT processes in an optimized manner.

That is, since the in-vehicle device 20 includes such a parallel program 21a1, the in-vehicle device 20 efficiently and effectively operates the first core 21c and the second core 21d.

In other words, the in-vehicle device 20 is capable of exerting a full capacity of the multi-core processor 21 provided with the first core 21c and the second core 21d, in comparison to the device that includes a parallel program that parallelizes the dependency analyzable process only.

Although the present disclosure has been described in detail in connection with preferred embodiment(s) thereof with reference to the accompanying drawings, it is to be noted that various changes and modifications will become apparent to those skilled in the art.

In the following, other embodiments of the present disclosure are described as a modification 1 through a modification 5.

The modification 1 through the modification 5 may be respectively implemented as an independent embodiment, or may also be implemented in combination. That is, various combinations of those modifications are implementable as being within the scope of the present disclosure.

(Modification 1)

Figure 6:
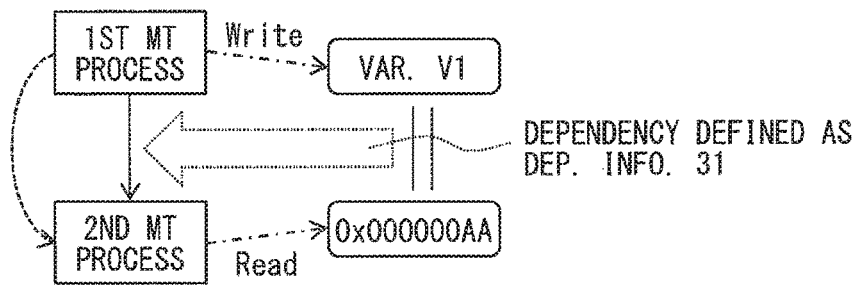
FIG. 6 is an illustration of the dependency information that defines/specifies the dependency relationship by using resources in a modification 1 of the present disclosure.

Dependency information 31 in the modification 1 includes the name of the resource accessed by the dependency un-analyzable process when the dependency un-analyzable process is performed, as shown in FIG. 6. That is, the dependency information 31 associates two resources that represent the same data, even though the names of the two resources are unknown. In other words, based on the dependency information 31, a dependency un-analyzable process and an MT process having the dependency relationship with the dependency un-analyzable process are indirectly associated via the resources. Therefore, the dependency information 31 may be designated as an indirect-type information 31.

Here, a situation in FIG. 6 is described in more details.

The first MT process performs "Write" to the variable V1. The second MT process performs "Read" to 0x000000AA. Further, the variable V1 and 0x000000AA are the same data. In such case, the first MT process and the second MT process have the dependency relationship.

However, the dependency analyzer 10b cannot determine whether the variable V1 and 0x000000AA are the same data. The indirect-type information 31 in this example associates the name of the variable V1 and the name of 0x000000AA. That is, the indirect-type information 31 includes the information (i.e., a list) indicating that the variable V1 and 0x000000AA are the same data. Further, the indirect-type information 31 is the information indicating that the variable V1 and 0x000000AA are the same resource.

Therefore, the computer 10 can determine, by using the indirect-type information 31, that the first MT process and the second MT process have the dependency relationship.

Note that information indicating that one resource (i.e., resource A) and the other resource (i.e., resource B) are actually the same resource may be describable as a list. Therefore, the dependency information 31 includes a list for each of such resources.

The computer 10 of the modification 1 achieves the same effects as the above-mentioned embodiments. Similarly, the automatic parallelization compiler 1 and the in-vehicle device 20 of the modification 1 achieve the same effects as the above-mentioned embodiments.

(Modification 2)

Figure 7:
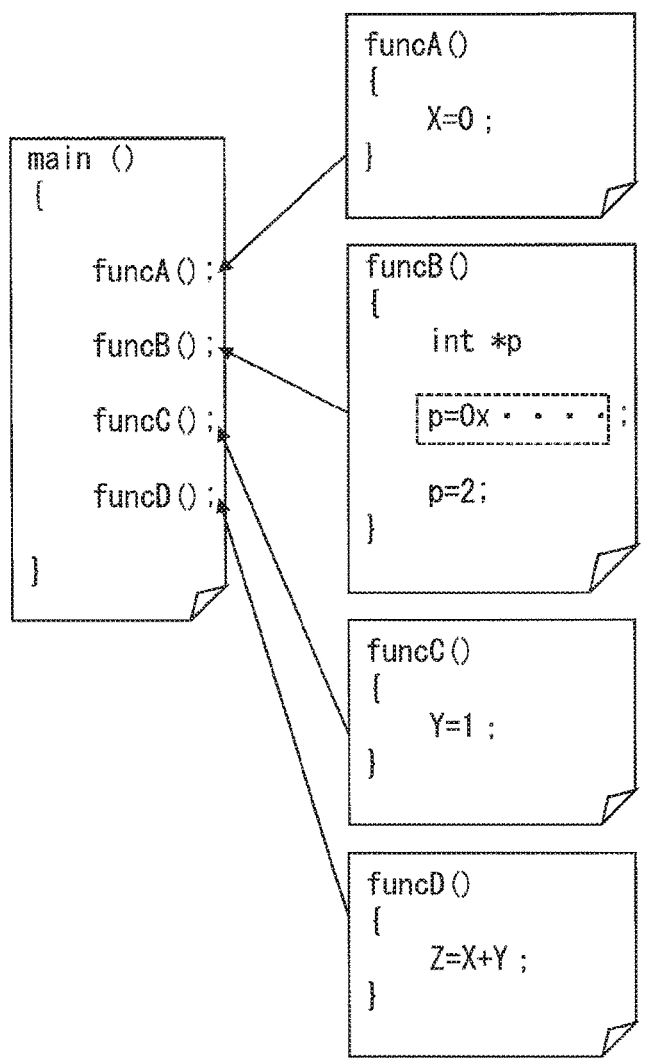
FIG. 7 is an illustration of unit processes in a modification 2 of the present disclosure.
Figure 8:
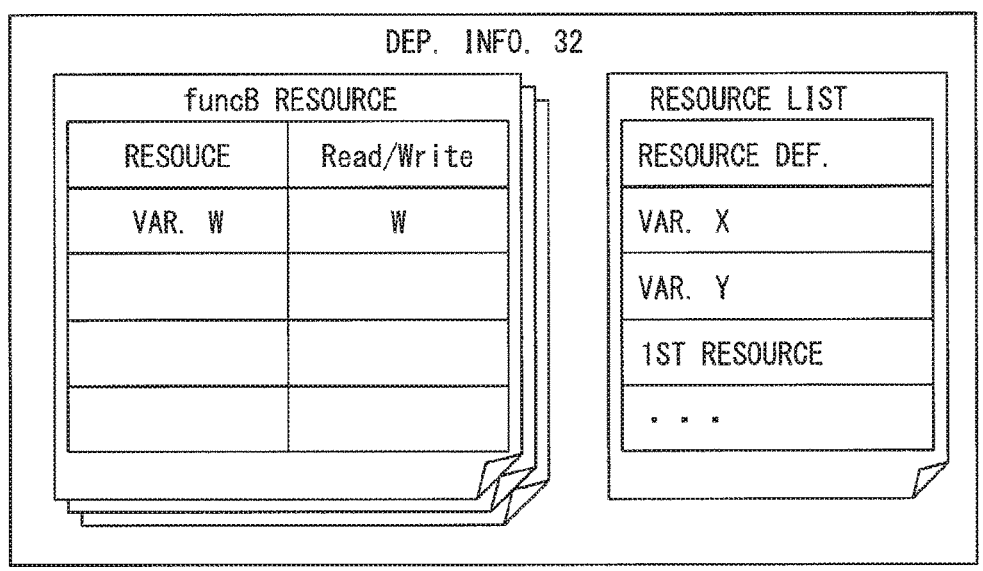
FIG. 8 is an illustration of the dependency information in the modification 2 of the present disclosure.
Figure 9:
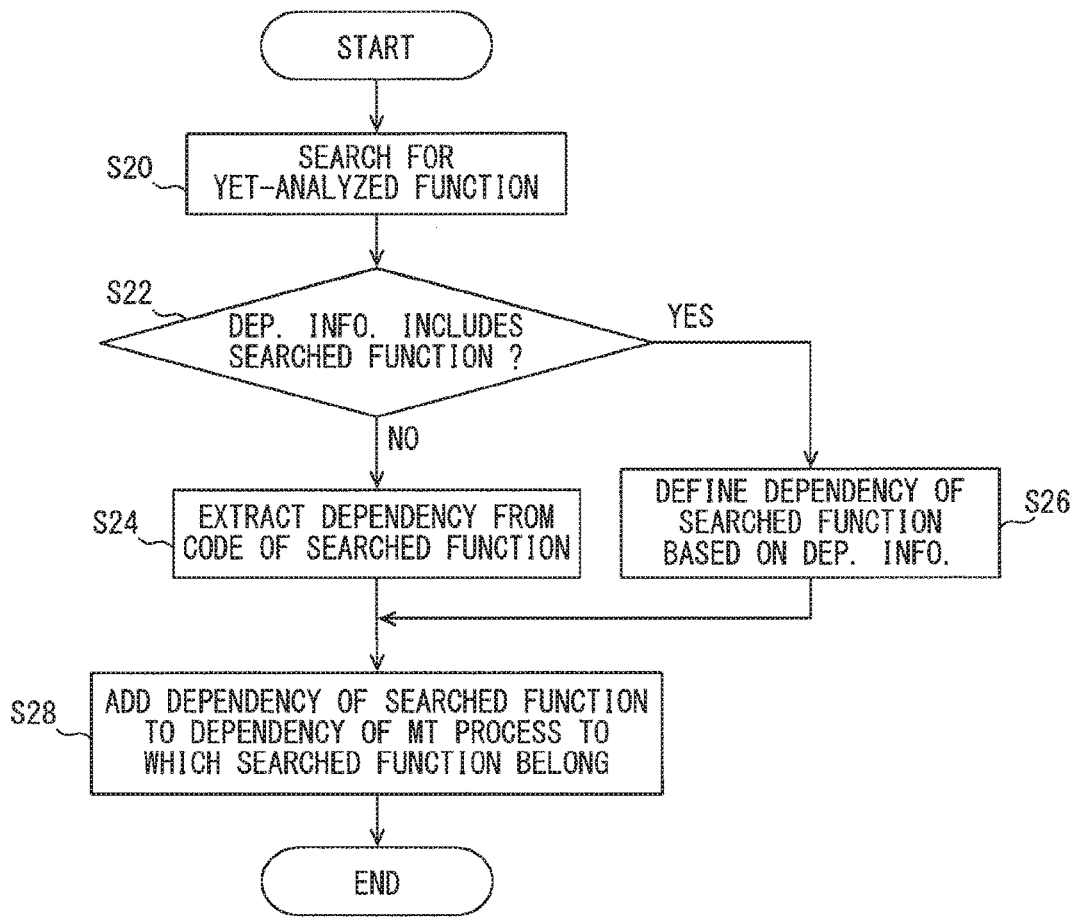
FIG. 9 is a flowchart of a process performed by the computer in the modification 2 of the present disclosure.

In the modification 2, as shown in FIG. 7, FIG. 8, and FIG. 9, a function serves as a unit process. A function is a kind of the MT process. Further, a function may include plural MT processes.

As shown in FIG. 7, a funcA( ) function writes a variable X. A funcC( ) function writes a variable Y. A funcD( ) function reads the variable X, reads the variable Y, and writes a variable Z.

Therefore, the dependency analyzer 10b can analyze the dependency relationship among the funcA( ) function, the funcC( ) function, and the funcD( ) function. Thus, the funcA( ) function, the funcC( ) function, and the funcD( ) function are respectively considered as a dependency analyzable process.

However, regarding a funcB( ) function including p=0x - - - -, the dependency analyzer 10b cannot grasp the resource of that "p=0x - - - -" part within a broken line.

Therefore, the dependency analyzer 10b cannot analyze the dependency relationship of the funcB( ) function. Thus, the funcB( ) function is considered as a dependency un-analyzable process.

Note that "p=0x - - - -" is an address of a variable W. That is, the funcB( ) function writes the variable W, and is unrelated to (i.e., does not manipulate) the variable X, the variable Y, and the variable Z.

In such case, as shown in FIG. 8, dependency information 32 includes, as resource information of the funcB( ) function, information indicating that the resource of the funcB ( ) function is the variable W to which the funcB( ) function writes (W) data.

That is, the dependency information 32 associates a dependency un-analyzable process with a resource that is accessed by that dependency un-analyzable process, and with what kind of function that dependency un-analyzable process provides.

The association established among a dependency un-analyzable process, an accessed resource accessed by a dependency un-analyzable process, and contents of processing (i.e., what kind of function) a dependency un-analyzable process provides for the accessed resource in the above-described manner by the dependency information 32 may be designated as a list.

Therefore, the dependency information 32 is considered as including a list for each of the dependency un-analyzable processes.

In other words, the dependency information 32 indirectly associates a dependency un-analyzable process with a function having the dependency relationship with that dependency un-analyzable process via, i.e., by way of, the resource. Therefore, the dependency information 32 can be considered as the indirect-type information.

The computer 10 grasps, i.e., can determine, the accessed resource that is accessed by a dependency un-analyzable process with reference to the dependency information 32, when that dependency un-analyzable process, among other un-analyzable processes, is performed.

Therefore, the computer 10 is enabled to determine, i.e., grasp, a function that has the dependency relationship with the dependency un-analyzable process, by referring to the dependency information 32.

As shown in FIG. 8, in addition to the information for determining the dependency relationship of each unit process, the dependency information 32 may also include a resource list in which a definition of the resources is shown.

Further, the resource list and resource access information may be provided as a set of information, for an addition of association information, in which a resource in the resource list is associated with a certain resource that is accessed by which function.

Further, information on a callee function in other modules called from a subject function is analyzed at the time of the automatic parallelization. Such analysis is performable by convergently analyzing a caller process (i.e., function) based on a call relationship (i.e., by performing an analysis based on a unit core allocation), for obtaining required information for allocating a core to a unit process.

Next, the processing operation of the modification 2 at the time of executing the automatic parallelization compiler 1 by the computer 10 is described with reference to FIG. 9.

The computer 10 generates the parallel program 21*a*1 by executing the automatic parallelization compiler 1. Each Step of FIG. 9 may be considered as equivalent to a procedure of the automatic parallelization compiler 1.

The yet-analyzed function is searched for in Step S20.

The computer 10 performs the process of FIG. 9 for each of a plurality of functions in the single program. That is, the computer 10 searches for a function that has not undergone the process after Step S22 among a plurality of functions in the single program in Step S20.

In other words, the computer 10 extracts a function that has not undergone the process after Step S22 from a plurality of functions in the single program.

Note that a dependency un-analyzable process extracted in this Step S20 may also be designated as a searched function.

For example, in the single program including the funcA( ) function to the funcD( ) function, when the funcB( ) function is extracted in Step S20, the searched function is the funcB( ) function.

In Step S22, it is determined whether the dependency information 32 has the searched function. That is, the computer 10 determines whether the resource information of the searched function extracted in Step S20 is included in the dependency information 32.

When the resource information of the searched function is included in the dependency information 32, the computer 10 considers that the dependency information 32 has the searched function, and the process proceeds to Step S26.

On the other hand, when the resource information of the searched function is not included in the dependency information 32, the computer 10 considers that there is no searched function in the dependency information 32, and the process proceeds to Step S24.

In Step S24, the code in the searched function is analyzed and the dependency relationship is extracted. That is, the dependency analyzer 10*b* of the computer 10 extracts the dependency relationship of the searched function.

In other words, the dependency analyzer 10*b* of the computer 10 extracts "dependency determining information" of each searched function, i.e., extracts the accessed resource accessed by the searched function and contents of processing (i.e., what kind of processing) performed by the searched function for the accessed resource.

Then, the dependency analyzer 10*b* of the computer 10 extracts, or determines, the MT process having the dependency relationship with the searched function.

On the other hand, in Step S26, the dependency relationship of the searched function is determined based on the dependency information 32. That is, the computer 10 uses the information about the searched function included in the dependency information 32 as the information for analyzing the dependency relationship of the searched function.

In other words, the computer 10 extracts the "dependency determining information", i.e., the accessed resource accessed by the searched function and contents of processing performed by the searched function for the accessed resource, from the dependency information 32.

For example, when the searched function is the funcB( ) function, the computer 10 uses, as the information for analyzing the dependency relationship of the funcB( ) function, the variable W as the accessed resource and "Write" as the contents of processing. That is, the computer 10 extracts, from the dependency information 32, information regarding the funcB( ) function that the func(B) function is a "Write" of the variable W In Step S28, the dependency relationship of the searched function is added to the dependency relationship of the MT process to which the searched function belongs. That is, the computer 10 adds (i) the information for analyzing the dependency relationship extracted in Step S24 and (ii) the information for analyzing the dependency relationship extracted in Step S26 to the MT process to which each searched function belongs.

The computer 10 repeats the execution of Steps S20-S28, and performs the flowcharted process of FIG. 9 for all the MT processes in the single program.

Further, the computer 10 assigns the dependency un-analyzable process and the dependency analyzable process to each core based on the dependency information and the analysis result analyzed by the dependency analyzer 10*b*, while fulfilling the dependency relationship. As a result, the funcA( ) function to the funcD( ) function are parallelized as shown in FIG. 10.

Figure 10:
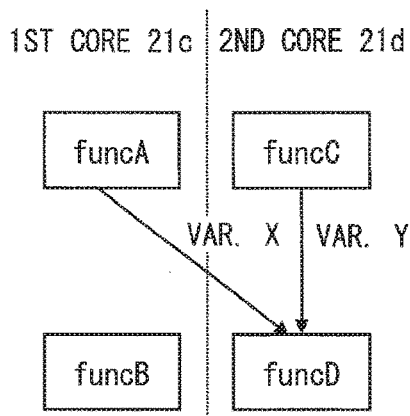
FIG. 10 is a block diagram of the unit processes after parallelization in the modification 2 of the present disclosure.

In an example of FIG. 10, it is assumed that only one function is included in each of the MT processes.

The computer 10 of the modification 2 achieves the same effects as the above-mentioned embodiments. Similarly, the automatic parallelization compiler 1 and the in-vehicle device 20 of the modification 2 achieve the same effects as the above-mentioned embodiments.

Further, even when a smaller unit than the MT process is used as a unit for the development of the parallelized software, the computer 10 and the automatic parallelization compiler 1 of the modification 2 is capable of achieving the same effects as the above-mentioned embodiments.

(Modification 3)

The modification 3 is described with reference to FIG. 11, FIG. 12, and FIG. 13. In the modification 3, as shown in FIG. 11, an 11th MT process, a 12th MT process, and a 13th MT process are respectively adopted as a unit process.

The 11th MT process writes to the variable V1, and writes to a variable V2. The 12th MT process reads the variable V1. The 13th MT process reads of the variable V2.

Figures 11, 12, 13:
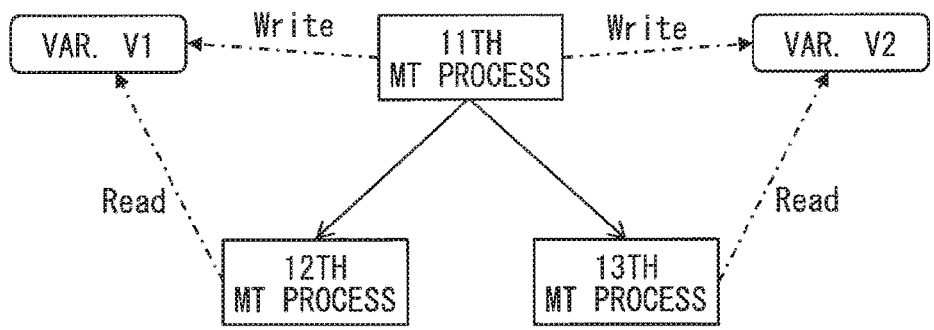
FIG. 11 is a block diagram of a relationship between the unit processes and the resources in a modification 3 of the present disclosure.
FIG. 12 is an illustration of the dependency information that defines/specifies the dependency relationship by using the unit processes in the modification 3 of the present disclosure.
FIG. 13 is an illustration of the dependency information that defines/specifies the dependency relationship by using the resources in the modification 3 of the present disclosure.

In the modification 3, "direct-type" dependency information 33 in FIG. 12 and "indirect-type" dependency information 34 in FIG. 13 are adopted.

In the dependency information 33 regarding the 11th MT process, the 12th MT process and the 13th MT process are associated, i.e., listed, respectively as a name of the MT process having the dependency relationship with the 11th MT process.

Further, in the dependency information 33 regarding the 12th MT process and regarding the 13th MT process, the 11th MT process is associated, i.e., listed, as a name of the MT process having the dependency relationship with the 12th MT process and with the 13th MT process.

Note that the dependency information 33 may also be provided as three separate pieces of information, i.e., as three separate lists, for listing each of the above-described three entries, i.e., three dependency relationships.

On the other hand, in the dependency information 34 regarding the 11th MT process, the 11th MT process is associated with (i) the variable V1, which is an accessed resource accessed by the 11th MT process, and with (ii) Write, which is the contents of processing performed by the 11th MT process for the variable V1. Further, the 11th MT process is also associated with (i) the variable V2, which is an accessed resource accessed by the 11th MT process, and with (ii) Write, which is the contents of processing performed by the 11th MT process for the variable V2.

Further, in the dependency information 34, association is established for the 12th MT process and for the 13th MT process. That is, the 12th MT process is associated with (i) the variable V1, which is an accessed resource accessed by the 12th MT process, and with (ii) Read, which is the contents of processing performed by the 12th MT process for the variable V1, and the 13th MT process is associated with (i) the variable V2, which is an accessed resource accessed by the 13th MT process, and with (ii) Read, which is the contents of processing performed by the 13th MT process for the variable V2.

Note that the dependency information 34 may also be provided as three separate, i.e., MT process specific, lists for showing the dependency relationships.

The computer 10 of the modification 3 achieves the same effects as the above-mentioned embodiments. Similarly, the automatic parallelization compiler 1 and the in-vehicle device 20 of the modification 3 achieve the same effects as the above-mentioned embodiments.

(Modification 4)

Figure 14:
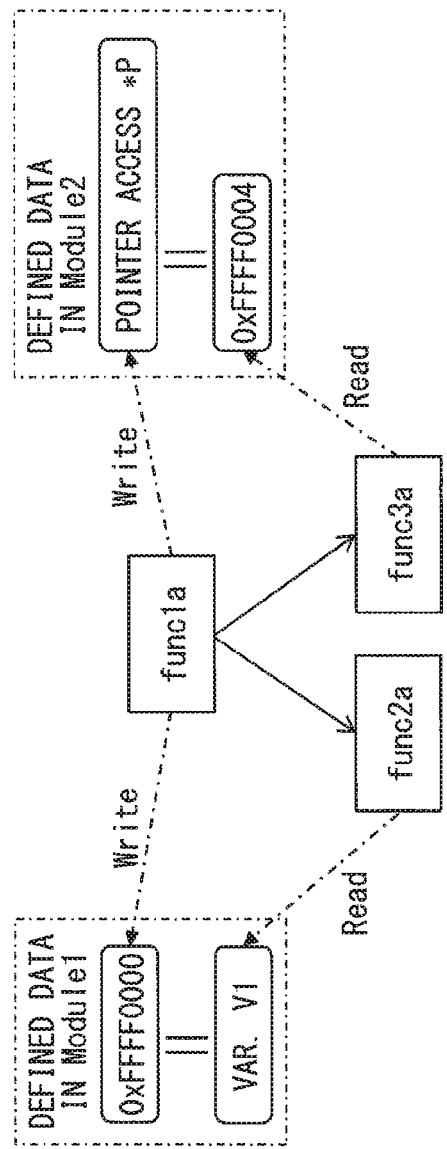
FIG. 14 is a block diagram of a relationship between the unit processes and the resources in a modification 4 of the present disclosure.

The modification 4 is described with reference to FIG. 14, FIG. 15, and FIG. 16. In the modification 4, as shown in FIG. 14, as a unit process, a func1a function, a func2a function, and a func3a function are adopted.

The func1a function writes to 0xFFFF0000, and writes to a pointer access *P. The pointer access *P is un-analyzable in terms of a pointing destination. The func2a function reads the variable V1. The func3a function reads 0xFFFF0004.

Here, as a base assumption, in each of a plurality of functions accessing to the same resource, the same resource is defined in different names.

For example, 0xFFFF0000 and the variable V1 show the same resource. However, in the func1a function, 0xFFFF0000 is defined as Unknown2 (see FIG. 15).

Further, the pointer access *P and 0xFFFF0004 show the same resource. However, in the func1a function, the pointer access *P is defined as Unknown3 (see FIG. 15).

On the other hand, in the func3a function, 0xFFFF0004 is defined as Unknown4 (see FIG. 15).

Further, 0xFFFF0000 and the variable V1 are the data defined in a first Module (i.e., Module1 in FIG. 14).

Further, the pointer access *P and 0xFFFF0004 are the data defined in a second Module (i.e., Module2 in FIG. 14).

In the following, Module1 and Module2 may both be designated as a "module".

Note that a module is a unit of function/processing, and also is a unit development of software. A module may also be designated as a unit of translation, which means that one source file corresponds to one unit translation.

However, since a header file include process must also be performed, a unit of translation is, strictly speaking, a pre-process undergone program text derived from one source file. Thus, a module corresponds to such a unit of translation. Further, in each of the modules, a resource is defined in a non-overlapping manner with other modules.

In the modification 3, "indirect-type" dependency information 35 shown in FIG. 15, and "indirect-type" dependency information 36 shown in FIG. 16 are adopted.

For each of the unit processes, the dependency information 35 associates, just like the information 34 in FIG. 13, the unit process with the accessed resource and with the contents of processing for the accessed resource performed by the unit process.

Further, in the dependency information 35, association among plural, i.e., different, names is established, indicating that the different names are for the same resource. For example, as shown in FIG. 15, as for the dependency information 35, association of 0xFFFF0000 and Unknown2 is established, and association of Unknown3 and Unknown4 is also established.

In such manner, the computer 10 can analyze the dependency relationship, even when two or more different names are defined in respective unit processes. Further, the computer 10 does not have to perform consistency check of the resource names defined by each of the unit processes.

As for the dependency information 36, association of plural names for the same resource is established, and association of those plural names and a module defining those plural names is further established.

For example, as shown in FIG. 16, the variable V1 is associated with the first module (i.e., Module 1), and Unknown2 is associated with the second module (i.e., Module 2).

The computer 10 of the modification 4 achieves the same effects as the above-mentioned embodiments. Similarly, the automatic parallelization compiler 1 and the in-vehicle device 20 of the modification 4 achieve the same effects as the above-mentioned embodiments.

(Modification 5)

The modification 5 is described with reference to FIG. 17.

In the present embodiment, the computer 10 assigns, to each of the multiple cores, an MT process that at least includes one function, while fulfilling the dependency relationship.

Therefore, the automatic parallelization compiler 1 includes a procedure that assigns, to each of the multiple cores, an MT process that includes at least one function, while fulfilling the dependency relationship.

Figure 17:
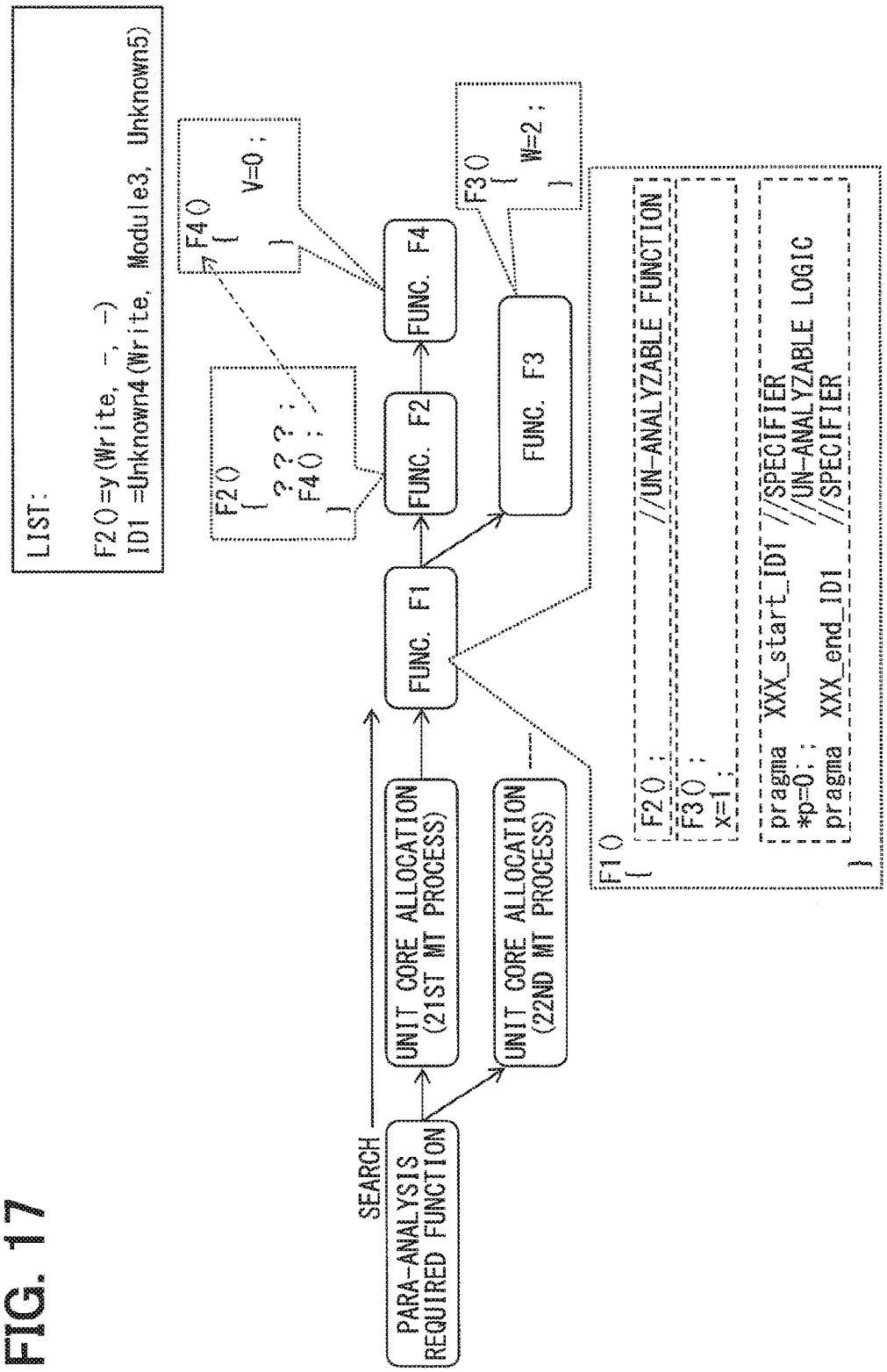
FIG. 17 is a block diagram of the unit processes in a modification 5 of the present disclosure.

Further, in the modification 5, as shown in FIG. 17, a single program including a 21st MT process, a 22nd MT process, and the like is adopted.

The computer 10 extracts all function call relationships from a parallelization-analysis required process. The computer 10 searches for functions based on the function call relationships. The computer 10 determines whether the searched function has a list-input required process or not. The computer 10 analyzes a resource access in the searched function. The computer 10 identifies a list-input required range.

Note that the list-input required range indicates a function written in a resource access list. That is, a function is a unit process that is associated with a resource access (e.g., MT process, function, etc.).

The computer 10 reads a list in the dependency information. Then, the computer 10 memorizes the obtained list as resource access information for the list-input required range of the searched function, and memorizes a resource access analysis result as the resource access information for the other part other than the list-input required range.

The computer 10 merges, function by function, a memory result of each of the searched functions according to the function call relationships, until a merging of the memory result as information of a parent function adds up to serve as an MT process. Therefore, the dependency information of the MT process including (i) a high-level function, which is a function in higher levels, and (ii) a low-level function, which is a function in lower levels called by the high-level function, is merged as the information of a higher-most function included in the MT process.

That is, the computer 10 determines the dependency un-analyzable process and the dependency analyzable process in an MT process.

Note that the dependency un-analyzable process in such case indicates a process to which a resource access list is input based on a human determination that the dependency is un-analyzable. On the other hand, the dependency analyzable process in such case indicates a process other than the dependency un-analyzable process.

Further, the computer 10 obtains, from the dependency information, the resource access information that corresponds to the dependency un-analyzable process, and memorizes the obtained information, and also memorizes the resource access information of the dependency analyzable process.

Further, the computer 10 merges the memorized resource access information as the resource access information of the higher-most function a parent function) in the MT process.

Therefore, the dependency information, i.e., the resource access information, of the MT process is information that is made up from merging of (i) the resource access information of the dependency un-analyzable process in the MT process and (ii) the resource access information of the dependency analyzable process in the MT process.

Note that the list-input required range may be an entirety of an MT process, or a part of an MT process. The list includes a symbol name of a random access memory (RAM) that is accessed by a process in the list-input required range. The list also includes a name of a resource that is accessed by a process in the list-input required range. The resource names are associated with a name of a unique unit process that is unique in the whole program.

Here, an example of the single program is described with reference to FIG. 17. The contents of each of the functions are respectively written in a balloon of dotted line in FIG. 17.

In the single program, as a result of searching for the 21st MT process, a function F1 is brought up as a searched function. The function F1 includes a function F2 which is a dependency un-analyzable process, a function F3 which is a dependency analyzable process, and a specifier that specifies a logic which is a dependency un-analyzable process.

The computer 10 obtains and memorizes the resource access information from the dependency information, without analyzing (i.e., without extracting) the resource access information in the function F2. For example, the resource access information of the function F2 is Write to a variable y.

Further, the computer 10 proceeds to an analysis of a sub-function F4 of the function F2.

Further, the computer 10 does not obtain the resource access information from the dependency information, because the function F3 is a dependency analyzable process of Write to a variable x (i.e., x is found in F3( ) as "x=1;" which is a second block of F1( )). Then, the computer 10 memorizes, as the resource access information of the function F3, Write to the variable x.

Further, the computer 10 obtains and memorizes the resource access information from the dependency information, without analyzing (i.e., without extracting) the resource access information in the specified range of the specifier.

For example, the resource access information in the specified range of the specifier is, in FIG. 17, Write to a resource "Unknown4" defined in the third module (i.e., "*p=0;" below F3( ) in FIG. 17) (i.e., Unknown3 in Module3 in FIG. 16=Unknown4 in FIG. 15).

Further, the computer 10 merges a plurality of the resource access information memorized as mentioned above as the resource access information of the function F1. That is, as a result of merging of the resource access information of the subordinate functions of the 21st MT process, the 21st MT process serves as a process that writes to a resource Unknown5 (Not illustrated) defined in the third module, and writes to the variable x, the variable y (Not illustrated), a variable v (in F4( )), a variable w (in F3( )).

The computer 10 uses, at the time of the analysis of the dependency relationship, the merged resource access information.

Note that a dependency relationship is generated for the 21st MT process, showing dependency of the 21st MT process on the other MT processes which access to the above-mentioned resources (data or the like) in the same manner as the 21st MT process.

The computer 10 of the modification 5 achieves the same effects as the above-mentioned embodiments. Similarly, the automatic parallelization compiler 1 and the in-vehicle device 20 of the modification 5 achieve the same effects as the above-mentioned embodiments.

Further, the computer 10 of the modification 5 can obtain information on analyzability determination (i.e., clarification of un-analyzable portion) and un-analyzable portion for each of the many functions (i.e., for each of software development person in charge).

Therefore, the computer 10 of the modification 5 is capable of performing an analysis and parallelization of the entire process/function/program including a conventionally un-analyzable portion.

Such changes, modifications, and summarized schemes are to be understood as being within the scope of the present disclosure as defined by appended claims.

What is claimed is:

1. A parallelization method for generating a parallel program that is executed by a multi-core microcomputer having a plurality of cores based on a dependency analysis of a bundle of unit processes in a single program that is executed by a single-core microcomputer having one core, the parallelization method comprising:

obtaining procedure for obtaining dependency information that enables a dependency determination of a dependency un-analyzable process, the dependency un-analyzable process including a bundle of unit processes for which the dependency analysis is unperformable;

analysis procedure for performing the dependency analysis of a dependency analyzable process, the dependency analyzable process including a bundle of unit processes for which the dependency analysis is performable; and assigning procedure for assigning each of the dependency un-analyzable process and the dependency analyzable process to each of the plurality of cores while fulfilling dependency among the dependency un-analyzable process and the dependency analyzable process, based on (i) the dependency information obtained by the obtaining procedure and (ii) an analysis result of the dependency analysis by the analysis procedure, wherein the dependency information includes a name of a resource that is accessed at an execution time of the dependency un-analyzable process, and the dependency information is stored in a data structure that specifies that different names are for a same resource, as defined by the unit processes, when two or more unit processes each accessing the same resource define a different name for the same resource.

2. The parallelization method of claim 1, wherein the dependency information includes a name of the unit process that has dependency with the dependency un-analyzable process.

3. The parallelization method of claim 1, wherein the single program includes a bundle of unit translations, and each of unit translations in the bundle of unit translations has a defined resource that is defined in a non-overlapping manner with other unit translations, and the dependency information associates the different names defined for the same resource with each other, and associates the different names defined for the same resource respectively with the unit translations defining the same resource having different names.

4. The parallelization method of claim 1, wherein the unit process is a function.

5. The parallelization method of claim 4, wherein the assigning procedure assigns a unit core allocation that includes at least one function to each of the plurality of cores while fulfilling a required dependency, and the dependency information of the unit core allocation including a high-level function and a low-level function that is called by the high-level function is merged as information of a highest-level function in the unit core allocation.

6. A parallelization tool for generating a parallel program that is executed by a multi-core microcomputer having a plurality of cores based on a dependency analysis of a bundle of unit processes in a single program that is executed by a single-core microcomputer having one core, the parallelization tool comprising:

an obtainer for obtaining dependency information that enables a dependency determination of a dependency un-analyzable process, the dependency un-analyzable process included in the bundle of unit processes for which the dependency analysis is unperformable;

an analyzer for performing the dependency analysis of a dependency analyzable process, the dependency analyzable process included in the bundle of unit processes for which the dependency analysis is performable; and an assigner for assigning each of the dependency un-analyzable process and the dependency analyzable process to each of the plurality of cores while fulfilling dependency among the dependency un-analyzable process and the dependency analyzable process, based on (i) the dependency information obtained by the obtainer and (ii) an analysis result of the dependency analysis by the analyzer, wherein the dependency information includes a name of a resource that is accessed at an execution time of the dependency un-analyzable process, and wherein the dependency information is stored in a data structure that specifies that different names are for a same resource, as defined by the unit processes, when two or more unit processes each accessing a same resource define different names for the same resource.

7. The parallelization tool of claim 6, wherein the dependency information includes a name of the unit process that has dependency with the dependency un-analyzable process.

8. The parallelization method of claim 6, wherein the single program includes a bundle of unit translations, and each of the unit translations in the bundle of unit translations has a defined resource that is defined in a non-overlapping manner with other unit translations, and the dependency information associates the different names defined for the same resource with each other, and associates the different names defined for the same resource respectively with the unit translation defining the same resource having different names.

9. The parallelization method of claim 6, wherein the unit process is a function.

10. The parallelization method of claim 9, wherein the assigner assigns a unit core allocation that includes at least one function to each of the plurality of cores while fulfilling the dependency, and the dependency information of the unit core allocation including a high-level function and a low-level function that is called by the high-level function is merged as information of a highest-level function in the unit core allocation.

11. An in-vehicle device comprising:

a multi-core microcomputer having a plurality of cores; and a parallel program executable by the multi-core microcomputer, the parallel program including a parallelization of a bundle of unit processes included in a single program for a single-core microcomputer having a single core, wherein the parallel program is assigned to each of the plurality of cores of the multi-core microcomputer, the assignment of the parallel program including assignment of (i) a dependency un-analyzable process and (ii) a dependency analyzable process among the bundle of unit processes, which is performed based on (a) dependency information that enables a dependency determination regarding dependency of the dependency un-analyzable process for which the dependency analysis is unperformable, and (b) an analysis result of dependency of the dependency analyzable process while fulfilling the dependency among the dependency un-analyzable process and the dependency analyzable process, and each of the plurality of cores of the multi-core microcomputer executes each of the assigned processes, wherein the dependency information includes a name of a resource that is accessed at an execution time of the dependency un-analyzable process, and wherein the dependency information is stored in a data structure that specifies that different names are for a same resource, as defined by the unit processes, when two or more unit processes each accessing the same resource define different names for the same resource.

* * * * *